United States Patent [19]
Krieger

[11] Patent Number: 5,900,331
[45] Date of Patent: May 4, 1999

[54] THERMAL BATTERY WITH REDUCED SELF-DISCHARGE

[75] Inventor: Frank C. Krieger, College Park, Md.

[73] Assignee: The United States of America as represented by the Secretary of the Army, Washington, D.C.

[21] Appl. No.: 08/934,002

[22] Filed: Aug. 27, 1997

[51] Int. Cl.$^6$ ...................................................... H01M 6/36
[52] U.S. Cl. .................................................................. 429/112
[58] Field of Search ....................................... 429/112, 110

[56] References Cited

U.S. PATENT DOCUMENTS

| | | | |
|---|---|---|---|
| 3,428,493 | 2/1969 | Adams | 429/112 |
| 3,725,132 | 4/1973 | Moser et al. | 429/112 |
| 4,596,752 | 6/1986 | Faul et al. | 429/112 |
| 5,382,479 | 1/1995 | Schuster | 429/112 |

*Primary Examiner*—Maria Nuzzolillo
*Assistant Examiner*—Susy Tsang
*Attorney, Agent, or Firm*—Paul S. Clohan, Jr.

[57] ABSTRACT

A thermal battery has an electrolyte-cathode layer; an anode layer adjacent the electrolyte-cathode layer; a steel cell cover adjacent the anode layer; an insulating layer adjacent the steel cell cover, the insulating layer having a volume resistivity in the range of $10^{14}$ to $10^{17}$ ohm-centimeter and a decomposition temperature of less than 1400 degrees Centigrade; and a heat source adjacent the insulating layer. Preferably, the decomposition temperature is less than 300 degrees Centigrade. The insulating layer helps reduce pre-activation self discharge of the thermal battery.

12 Claims, 1 Drawing Sheet

THERMAL BATTERY WITH REDUCED SELF-DISCHARGE

BACKGROUND OF THE INVENTION

The present invention relates in general to reducing the self discharge of thermal batteries, and in particular to reducing the self discharge of thermal batteries having a high conductivity electrolyte salt.

Thermal batteries that use the high conductivity electrolyte salt LiCl-LiBR-LiF eutectic are more subject to self discharge during their storage lifetimes than are the traditional thermal batteries that use the LiCl-KCl eutectic. For the traditional LiCl-KCl thermal batteries, the cold (unactivated) voltage is usually less than 10 millivolts for a nominal 30 volt battery when measured with a 10 megohm input meter. For LiCl-LiBr-LiF electrolyte thermal batteries, cold voltage measured during storage with a 10 megohm input is typically several volts and may be a substantial fraction (30 to 60 percent) of the activated voltage. The much larger cold voltage of LiCl-LiBr-LiF batteries may permit significantly more self discharge during storage for many fuze applications.

SUMMARY OF THE INVENTION

It is an object of the present invention to reduce the self discharge of thermal batteries during extended storage.

This and other objects of the invention are achieved by a thermal battery comprising an electrolyte-cathode layer; an anode layer adjacent the electrolyte-cathode layer; a steel cell cover adjacent the anode layer; an insulating layer adjacent the steel cell cover, the insulating layer having a volume resistivity in the range of $10^{14}$ to $10^{17}$ ohm-centimeter and a decomposition temperature of less than 1400 degrees Centigrade; and a heat source adjacent the insulating layer.

In a second embodiment, the thermal battery further comprises a second steel cell cover between the insulating layer and the heat source, both steel cell covers being bonded to the insulating layer.

Preferably, the electrolyte is LiCl-LiBr-LiF eutectic and the heat source is a $Fe/KClO_4$ pyrotechnic heat source.

In a preferred embodiment, the decomposition temperature is less than 300 degrees Centigrade.

In a third embodiment, the diameter of the insulating layer is greater than a diameter of the steel cell cover and the insulating material is a nonbonded wafer.

These and other objects, features and advantages of the invention will become apparent from the following detailed description taken in conjunction with the accompanying drawings.

DETAILED DESCRIPTION OF THE PREFERRED EMBODIMENTS

The present invention is a thermal battery having an electrolyte-cathode layer; an anode layer adjacent the electrolyte-cathode layer; a steel cell cover adjacent the anode layer; an insulating layer adjacent the steel cell cover, the insulating layer having a volume resistivity in the range of $10^{14}$ to $10^{17}$ ohm-centimeter and a decomposition temperature of less than 1400 degrees Centigrade; and a heat source adjacent the insulating layer. The insulating layer helps reduce preactivation self discharge of the thermal battery.

The present invention helps reduce pre-activation self discharge by coating a cell cover (current collector) with epoxy (insulating layer) or a similiar substance during battery manufacture. Major suppliers of epoxy-like material such as Shell, General Electric, Cotronics and Hysol all list numerous products in their sales brochures that can be used as the insulating layer. The most useful products will have electrical resistivities in the range of $10^{14}$ to $10^{17}$ ohm-cm and will decompose thermally at 300 degrees C or less.

Thermal batteries are typically activated using the $Fe/KClO_4$ 84/16 weight ratio pyrotechnic heat source. This heat source has a calculated peak temperature of 1418 degrees C from −40 degrees C, which is far in excess of the typical decomposition temperature of about 400 degrees F (204 degrees C) for most epoxy-like materials. The epoxy-like materials are burned off on battery initiation, after which the battery operates normally.

Thermal batteries are ordinarily subjected to vibration testing. The epoxy-like material must not be electrically short circuited by such mechanical stress during storage and handling. Any direct electrical contact across the epoxy layer would probably defeat the entire epoxy layer because of the very high resistance of the epoxy-like layer compared with the electrical load on the battery during storage. One method to reduce the possibility of unwanted short circuits is to apply the thin epoxy-like insulating layer 26 shown in FIG. 1 in two coats. The first coat would be applied to the steel cell cover 24 and would insure that the electrically conductive 84/16 weight percent $Fe/KClO_4$ heat pellet is electrically insulated from the steel cell cover 24 during storage. The second coat would bind the $Fe/KCl_4$ heat pellet to the first insulating layer to eliminate movement at the $Fe/KCl_4$-insulating layer interface during vibration. A second method is to bond two steel cell covers together with the epoxy-like material and use this sandwich construction in place of a single cell cover as shown in FIG. 2. A third method which would be effective at the cell edges is to add an epoxy-like wafer with an oversize diameter rather than bonding the epoxy-like layer directly to the metal cell cover, as shown in FIG. 3.

Figure 1:
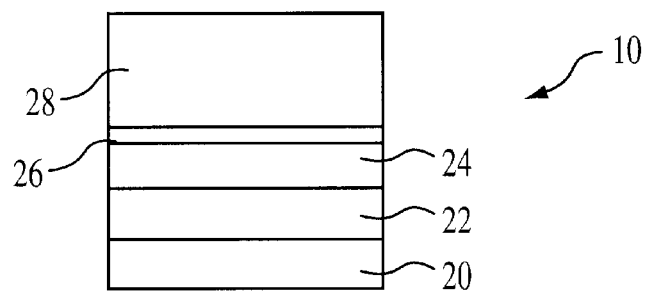
FIG. 1 shows one embodiment of the invention.
Figure 2:
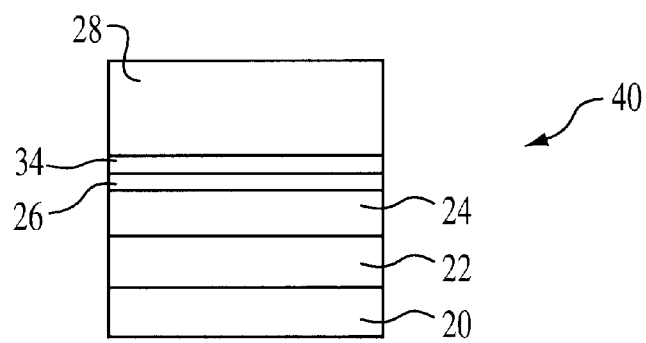
FIG. 2 shows a second embodiment of the invention.

FIG. 1 shows one embodiment of the invention. A thermal battery 10 has an electrolyte-cathode layer 20; an anode layer 22 adjacent the electrolyte-cathode layer 20; a steel cell cover 24 adjacent the anode layer 22; an insulating layer 26 adjacent the steel cell cover 24, the insulating layer 26 having a volume resistivity in the range of $10^{14}$ to $10^{17}$ ohm-centimeter and a decomposition temperature of less than 1400 degrees Centigrade; and a heat source 28 adjacent the insulating layer 26.

FIG. 2 shows a second embodiment of the invention. Thermal battery 40 is similiar to the battery 10 of FIG. 1, except that a second steel cell cover 34 is disposed between the insulating layer 26 and the heat source 28. Both steel cell covers 24, 34 are chemically bonded to the insulating layer 26.

Figure 3:
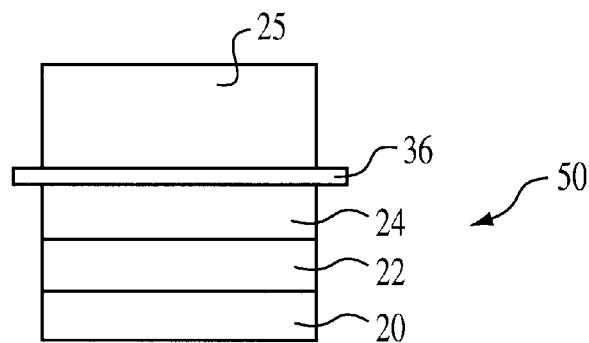
FIG. 3 shows a third embodiment of the invention.

FIG. 3 shows a third embodiment of the invention. Thermal battery 50 is similiar to the battery 10 of FIG. 1, except that a diameter of the insulating layer 36 is greater than a diameter of the steel cell cover 24. Insulating layer 36 is in the form of a wafer that is inserted during construction and is not chemically bonded on either of its faces.

Typical thicknesses of the layers are 0.018 inches for the electrolyte-cathode layer; 0.016 inches for the anode layer;

0.003 inches of the steel cell cover; 0.003 inches for the insulating layer; and 0.016 inches for the heat source. The cell covers and the insulating layer will normally be thin with respect to the other components.

EXAMPLE

A LiCl-LiBr-LiF eutectic electrolyte 90 amp-minute 38–50 volt thermal battery constructed at the Army Research Laboratory (ARL) was vacuum dried at +60° C. The battery then showed a cold voltage of 2.3 volts at room temperature and 30 volts at +60° C. If this battery were subjected to a 10 megohm load during storage, the current drain at room temperature would be $2.3 \times 10^{-7}$ amperes. Over 20 years storage ($1.05 \times 10^7$ minutes) a total of $2.3 \times 10^{-7} \times 1.05 \times 10^7 =$ 2.4 amp-minutes of life would be lost Et room temperature and $30 \times 10^{-7} \times 1.05 \times 10^7 = 31.5$ amp-minutes of life would be lost at +60° C.

When the ARL battery described above was vacuum dried at +25° C., the measured cold voltage was 21.4 volts at room temperature using a 10 megohm input. This type of battery is often dried at +25° C. in production to avoid deterioration of the lithium in the anodes. If production batteries of this type are dried at +25° C. instead of +60° C., high discharge rates during storage at +25° C. (room temperature) could also be expected. There is no reported data on cold voltage versus storage time, either for initial +25° C. or +60° C. vacuum drying sequences, but LiCl-LiBr-LiF batteries are expected to deteriorate faster in the field than batteries using the traditional LiCl-KCl eutectic.

For the ARL battery with its three inch diameter cell (45.60 $cm^2$ cell area), an 0.005 inch thick layer of a $10^{15}$ ohm-cm substance adds a resistance of $(10^{15} \times 0.005 \times 2.54)/(45.60) = 2.78 \times 10^{11}$ ohms to the battery. The storage current with a 10 megohm external load for the above-described battery dried at +60° C. becomes $2.3/(2.78 \times 10^{11})$ at room temperature and $30/(2.78 \times 10^{11})$ at +60° C. The maximum amount of coulombic loss over 20 years time at +60° C. would then be only $30/(2.78 \times 10^{11}) \times 1.05 \times 10^7 = 1.13 \times 10^{-3}$ amp min., so that the coulombic loss is reduced by a factor of $31.5/1.13 \times 10^{-3} = 2.8 \times 10^4$ over that of the unprotected battery at +60 degrees C.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. A thermal battery comprising:

an electrolyte-cathode layer;

an anode layer adjacent the electrolyte-cathode layer;

a steel cell cover adjacent the anode layer;

an insulating layer adjacent the steel cell cover, the insulating layer having a volume resistivity in the range of $10^{14}$ to $10^{17}$ ohm-centimeter and a decomposition temperature of less than 1400 degrees Centigrade; and a heat source adjacent the insulating layer.

2. The thermal battery of claim 1, further comprising a second steel cell cover between the insulating layer and the heat source, both steel cell covers being bonded by the insulating layer.

3. The thermal battery of claim 1 wherein the electrolyte is LiCl-LiBr-LiF eutectic.

4. The thermal battery of claim 2 wherein the electrolyte is LiCl-LiBr-LiF eutectic.

5. The thermal battery of claim 1 wherein the heat source is a $Fe/KClO_4$ pyrotechnic heat source.

6. The thermal battery of claim 2 wherein the heat source is a $Fe/KClO_4$ pyrotechnic heat source.

7. The thermal battery of claim 1 wherein the de composition temperature is less than 300 degrees Centigrade.

8. The thermal battery of claim 2 wherein the decomposition temperature is less than 300 degrees Centigrade.

9. The thermal battery of claim 1 wherein the insulating layer is bonded to the steel cell cover and the heat source.

10. The thermal battery of claim 1 wherein a diameter of the insulating layer is greater than a diameter of the steel cell cover and the insulating layer is not bonded chemically at either face.

11. The thermal battery of claim 1 wherein the insulating layer comprises epoxy material.

12. The thermal battery of claim 2 wherein the insulating layer comprises epoxy material.

* * * * *